US007191243B2

(12) United States Patent
Roy et al.

(10) Patent No.: US 7,191,243 B2
(45) Date of Patent: Mar. 13, 2007

(54) SCHEDULING AND MULTIPLEXING DATA FOR BROADCAST TRANSMISSION OVER MULTIPLE STREAMS

(75) Inventors: Paul J. Roy, Mountain View, CA (US); Majd Bakar, Castro Valley, CA (US); Jeffrey W. Huth, Corralitos, CA (US); Mark Wagner, Mountain View, CA (US); Stuart Ozer, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 800 days.

(21) Appl. No.: 10/002,026

(22) Filed: Nov. 15, 2001

(65) Prior Publication Data

US 2003/0093546 A1 May 15, 2003

(51) Int. Cl.
*H04N 7/173* (2006.01)
*H04B 7/212* (2006.01)

(52) U.S. Cl. ............. 709/231; 709/243; 709/236; 725/93; 725/94; 725/97; 370/342; 370/442

(58) Field of Classification Search ........ 709/230–236, 709/106, 203, 217, 103, 243; 710/20, 51–52; 711/112, 170; 370/211, 230, 232, 241, 234, 370/342, 442; 725/32, 119, 97, 91, 95, 114, 725/93, 94
See application file for complete search history.

(56) References Cited

U.S. PATENT DOCUMENTS

| 5,585,838 | A | | 12/1996 | Lawler et al. ............. 348/13 |
|---|---|---|---|---|
| 5,938,734 | A | * | 8/1999 | Yao et al. ............... 709/232 |
| 6,041,359 | A | | 3/2000 | Birdwell ................. 709/238 |
| 6,134,596 | A | * | 10/2000 | Bolosky et al. .......... 709/233 |
| 6,173,325 | B1 | | 1/2001 | Kukreja ................. 709/224 |
| 6,292,835 | B1 | * | 9/2001 | Huang et al. ........... 709/235 |
| 6,357,042 | B2 | * | 3/2002 | Srinivasan et al. ........ 725/32 |
| 6,449,688 | B1 | * | 9/2002 | Peters et al. ............ 711/112 |
| 6,546,428 | B2 | * | 4/2003 | Baber et al. ............ 709/232 |
| 6,557,030 | B1 | * | 4/2003 | Hoang ................... 709/217 |
| 6,598,078 | B1 | * | 7/2003 | Ehrlich et al. .......... 709/224 |
| 6,901,604 | B1 | * | 5/2005 | Kiraly .................... 725/93 |
| 7,020,893 | B2 | * | 3/2006 | Connelly ................. 725/97 |
| 7,099,348 | B1 | * | 8/2006 | Warwick ................ 370/442 |

OTHER PUBLICATIONS

Kim, Jin-Cheol; Park, Nam-Soo; and Yang, Kyu-Tae; Functional Enhancement of the Digitial DBS Set Top Box for the Multimedia Data Broadcast Services, *Satellite Communication Division*, 1997, vol. 3, pp. 1161-1165.

(Continued)

*Primary Examiner*—Jeffrey Pwu
*Assistant Examiner*—Jude Jean-Gilles
(74) *Attorney, Agent, or Firm*—Workman Nydegger

(57) ABSTRACT

Methods, systems, and computer program products for generating a data stream for broadcast to one or more client systems. A source identifier identifies where the data for the data stream may be obtained. Scheduling information associated with the identifier determines when the data should be added to the data stream for broadcast. The data is requested and received from the data source using the identifier and added to the data stream to arrive at the one or more client systems in accordance with the scheduling information. The generated data stream may comprise one or more substreams. The scheduling information may be checked or validated to assure consistency and accuracy. Client systems may simultaneously receive data, including real-time data, from multiple sources.

44 Claims, 4 Drawing Sheets

OTHER PUBLICATIONS

Vojcic, Branimir; Alagoz, Fatih; Al-Rustamani, Amina; and Pickholtz, Raymond; Management of Heterogeneous Traffic Loading in DBS Networks, *Proceedings of SPIE: Digitization of the Battlespace IV*, Apr. 1999, vol. 3709, pp. 52-63.

* cited by examiner

SCHEDULING AND MULTIPLEXING DATA FOR BROADCAST TRANSMISSION OVER MULTIPLE STREAMS

CROSS-REFERENCE TO RELATED APPLICATIONS

N/A

BACKGROUND OF THE INVENTION

1. The Field of the Invention

The present invention relates to data broadcast systems. More specifically, the present invention relates to methods, systems and computer program products for generating a data stream of a specified bandwidth for broadcast to one or more client systems.

2. Background and Related Art

In general, broadcasting involves transmitting the same data from one source to multiple clients using a common bandwidth. Broadcasting data occurs in many contexts, including television broadcast over public airways, audio and video signals broadcast over cable and satellite systems, and various of electronic content broadcast over the Internet. Broadcasting often involves a one-way communication channel. Limitation to one-way communication is not a requirement to broadcast data, but often allows for more efficient use of available bandwidth. Furthermore, in some situations, including broadcast television and satellite systems, it may not be practical or feasible for clients to transmit data over the same channel through which they receive data.

Broadcasting over a one-way communication channel, however, presents certain challenges. For example, with a one-way communication path, a data sender does not receive any acknowledgement from an intended data receiver that the data has, in fact, been received. Because of this uncertainty and depending on the importance of the data, a sender may retransmit data in an effort to increase the probability that the data is received. The frequency of the retransmissions may be termed the "retransmission frequency."

While some sources provide static data, or in other words, data that generally does not change between successive retransmissions, other sources provide dynamic data. Dynamic data changes on a relatively regular basis and must be refreshed periodically from the source to assure that a client has current data. The frequency at which dynamic data is refreshed may be termed the "refresh frequency" and is distinct from the retransmission frequency.

In addition to static and dynamic data, some data may be real-time in nature and designed for immediate consumption by a receiving client. For example, a client may be running an application that presents real-time data for sporting events in progress. The real-time data may include team and/or player names, status information regarding an event's progress (e.g., time remaining or played, inning, lap, etc.), statistical information relevant to the event, etc. Although the data certainly has value that lasts beyond the sporting event, its most significant value and intended purpose is providing real-time information.

Independent of whether data is static, dynamic, or real-time, at any given client various applications may be executing and consuming data concurrently. For these applications to operate properly, it may be important to deliver data to more than one application at once. In some broadcast systems, the complexity of retransmitting static data, refreshing dynamic data, broadcasting real-time data, allowing simultaneous delivery of data, and doing so efficiently within a fixed bandwidth, has proved to be a daunting task. The solution generally has been to organize all data to be broadcast in a carousel of some sort, with all data essentially being treated equally. As the carousel proceeds, data is either retransmitted or refreshed according to the sequence that it is placed in the carousel. Because data in the carousel is treated equally, any data that should be transmitted in real-time waits for whatever data is ahead of it in the carousel.

Another problem found in some broadcast systems relates to limited flexibility in selecting arbitrary sources of data for broadcast. Generally, data to be broadcast first must be copied from the arbitrary source into the carousel. Among other things, copying the data itself into the carousel makes using arbitrary third-party data providers somewhat more complicated and may require significant storage resources.

BRIEF SUMMARY OF THE INVENTION

The present invention generates a data stream of a specified bandwidth for broadcast to one or more client systems. The data to be added to the data stream is specified with an identifier that identifies a source where the data may be obtained. Scheduling information associated with the identifier includes a time when the data should be added to the data stream for broadcast to the one or more client systems. Using the identifier, the data is requested and subsequently received from the data source. Then, at the time indicated in the scheduling information, the data is added to the data stream, arriving at the one or more client systems in accordance with the scheduling information.

Among other things, the scheduling information may include (i) a broadcast start time, (ii) a retransmission frequency indicating how often static data should be broadcast to the one or more client systems, (iii) a refresh frequency indicating how often dynamic data should be updated at the one or more client systems, (iv) a time when a final broadcast of the data should end, (v) meta-data associated with the data to be broadcast, (vi) a bandwidth allocation for the data to be broadcast and (vii) data size information for static data. Meta-data, for example, may include (a) an expiration time after which the data may be deleted from the one or more client systems, (b) an extension time for extending the expiration time of data that already exists, (c) one or more flags determining how the data may be updated, (d) a trigger that causes a client system to perform some action, (e) one or more expressions for specifying conditions that may be associated with the data, such as conditions for the data's use at a client system, and (f) any other information that is associated with the data to be broadcast.

The scheduling information also may be used to determine the availability of bandwidth within the data stream. For example, when attempting to define the scheduling information associated with a particular data source identifier, existing scheduling information may be checked to verify that bandwidth is available in the data stream. The scheduling information also may be used for other types of validation and consistency checks. By maintaining scheduling information for each data source, the present invention helps assure efficient usage of broadcasting bandwidth.

The data stream may be divided into a plurality of sub-streams to facilitate simultaneous delivery of data from multiple sources to the one or more client systems. For example, one of the sub-streams may be dedicated to real-time data. Some sub-streams may contain data for distinct applications so that multiple applications are able to run concurrently at a single client. In general, data may be included within any one or more of the sub-streams.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which.

DETAILED DESCRIPTION OF THE PREFERRED EMBODIMENTS

The present invention extends to methods, systems, and computer program products for generating a data stream of a specified bandwidth for broadcast to one or more client systems. An identifier identifies the source where data to be added to the data stream may be obtained and scheduling information determines when the data should be added to the data stream for broadcast to the one or more client systems. After the data is requested using the identifier and received from the data source, the data is added to the data stream so that it arrives at the one or more client systems in accordance with the scheduling information. The embodiments of the present invention may comprise one or more special purpose or general purpose computers including various computer hardware, as discussed in greater detail below.

Embodiments within the scope of the present invention also include computer-readable media for carrying or having computer-executable instructions or data structures stored thereon. Such computer-readable media may be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
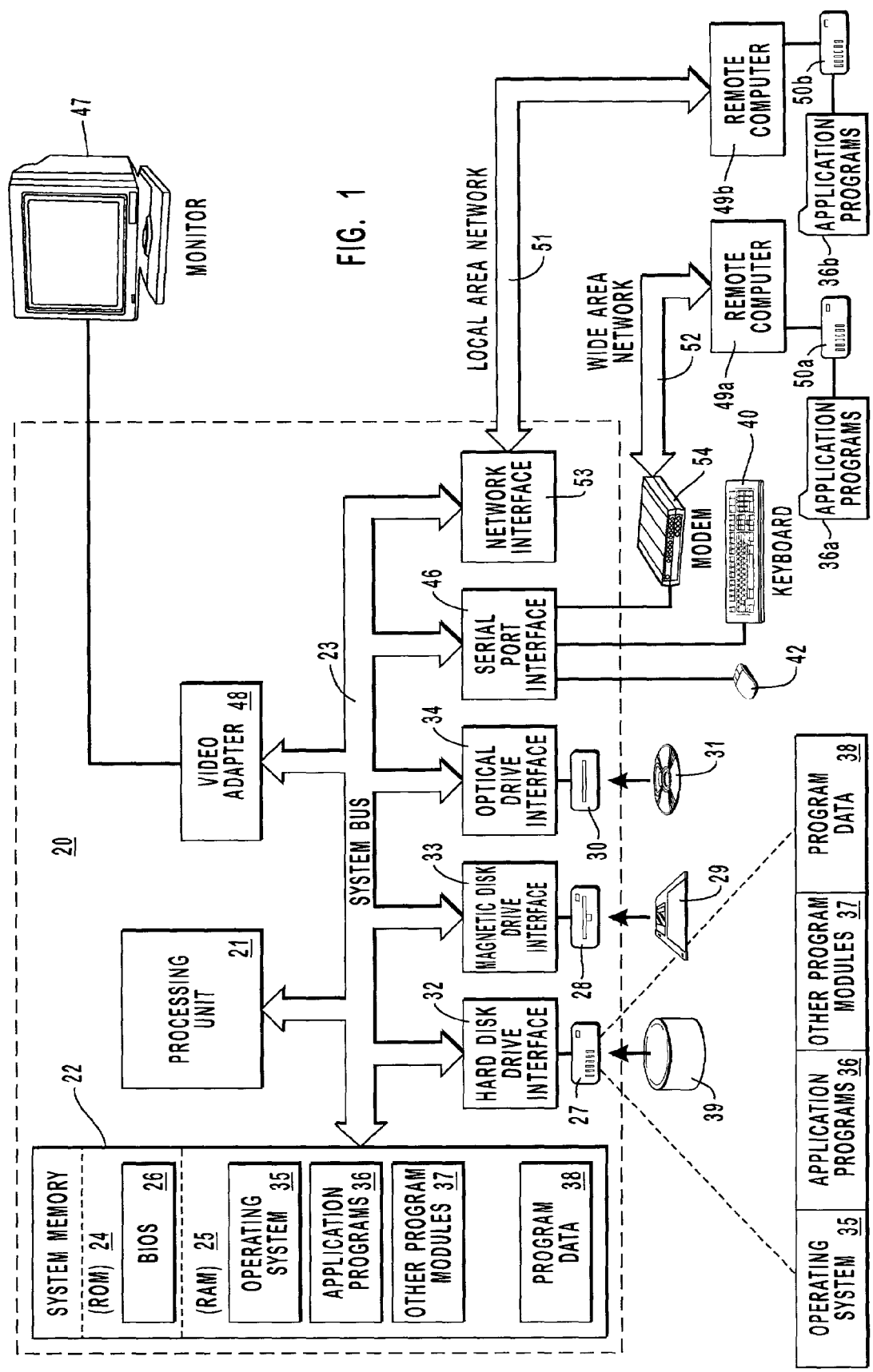
FIG. 1 illustrates an exemplary system that provides a suitable operating environment for the present invention.

FIG. 1 and the following discussion are intended to provide a brief, general description of a suitable computing environment in which the invention may be implemented. Although not required, the invention may be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disc drive 30 for reading from or writing to removable optical disc 31 such as a CD-ROM or other optical media. The magnetic hard disk drive 27, magnetic disk drive 28, and optical disc drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disc 31, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 39, magnetic disk 29, optical disc 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, computers typically include other peripheral output devices.

The computer 20 may operate in a networked environment using logical connections to one or more remote computers, such as remote computers 49a and 49b. Remote computers 49a and 49b may each be another computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Figure 2:
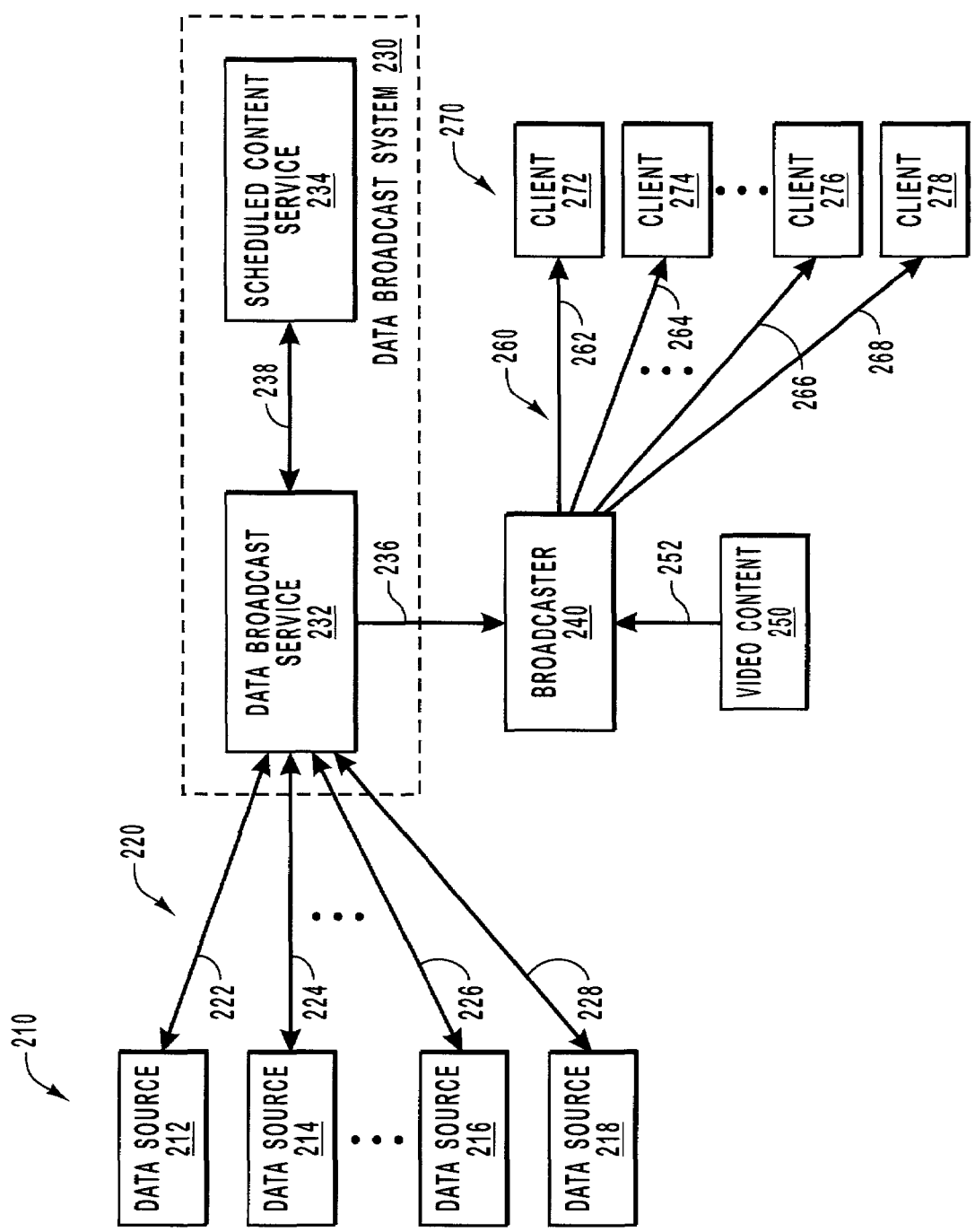
FIG. 2 is a block diagram showing the interaction of various components in an embodiment of a system operating in accordance with the present invention.

FIG. 2 is a block diagram showing the interaction of a data broadcast system 230 according to the present invention with various other components. Data broadcast system 230 includes a data broadcast service 232 and a scheduled content service 234. The data broadcast system 230 may comprise one or more of the computers described with reference to FIG. 1, although the present invention does not impose any particular hardware or software configurations. The scheduled content service 234 maintains scheduling information regarding all broadcast streams and data to be broadcast. In a general sense, a broadcast stream represents a stream of data for broadcast to one or more clients. A broadcast stream has an associated bandwidth allocation as well as physical parameters that facilitate delivery of the data using network protocols. As used in this application, data stream and data sub-stream should be interpreted broadly to encompass the foregoing description of a broadcast stream.

A sub-stream is a logical allocation of bandwidth into which data is scheduled and each sub-stream may be associated with one or more streams. A package is a collection of one or more data elements that may be grouped together for convenience or some other purpose. Data elements are the actual data to be broadcast. As used in this application, data and data elements should be interpreted broadly to include virtually any type of data. Those of skill in the art will recognize that the present invention is not limited to any of the particular organizations or divisions of data that are identified above. Streams, sub-streams, packages, and data elements merely represent terms used to describe an embodiment of the present invention in connection with FIG. 2. Many other divisions and allocations of both bandwidth and data are possible, all of which should be considered to fall within the scope of the present invention.

As noted above, the scheduled content service 234 maintains scheduling information regarding all broadcast streams 236 and data to be broadcast. This information may include (i) the data itself or identifier for a source where the data may be obtained, (ii) a specification of the package that the data is a part of, or information that allows the package to be inferred, (iii) a specification of the sub-stream(s) or stream(s) that the package is part of, (iii) a schedule specifying the day/time when the first transmission should begin and a day/time when the last transmission should be finished, (vi) a retransmission frequency, (vii) a source refresh frequency, (viii) associated meta-data that should be transmitted with the data, (ix) a bandwidth allocation for the data to be broadcast and (x) data size, in bytes, for static information that is to be broadcast. Scheduling information may be entered into scheduled content service 234 through an interface, such as a GUI, an API, etc.

Meta-data may include (i) an expiration time after which the data may be deleted from the one or more client systems, (ii) an extension time for extending the expiration time of data that already exists, (iii) one or more flags determining how the data may be updated, (iv) a trigger that causes a client system to perform some action, (v) one or more expressions for specifying conditions that may be associated with the data, such as conditions for the data's use at a client system, and (vi) any other information that is associated with the data to be broadcast. One example of one or more flags for determining how data may be updated is an atomic update flag for a directory. If a directory is flagged for atomic update, then it is populated only once and must be completely replaced if any of the directory's files are to be updated.

By maintaining scheduling information regarding all broadcast streams and data to be broadcast, scheduled content service 234 is able to determine the availability of bandwidth with the one or more data streams 236. In particular, when scheduling information for a data source identifier is defined, previously existing scheduling information may be checked to verify that the required bandwidth is available. Checks also may include assuring that clients are not overwhelmed by receiving data too fast. For example, clients may be unable to receive more than a set number of files simultaneously and delivering more than the set number of files at one time may result in data loss or performance problems. Other checking may include verifying that path names are correct for files to prevent entire directories from being overwritten accidentally. Maintaining scheduling information for each data source also helps assure efficient usage of the bandwidth available for broadcasting data to the client systems 270 and helps assure proper operation of clients that receive data from the broadcast stream.

When the data to be broadcast is of a known size, additional checking may be performed to ensure that the bandwidth allocated, start time, end time, and refresh or retransmission frequency are consistent both with the size (in bytes) of the data to be sent and the available unallocated bandwidth in the desired time period. The scheduling process for data of a known size may also be configured to automatically assign or recommend a bandwidth, given a refresh or retransmission frequency and the data size. Similarly, the scheduling process for data of a known size may be configured to automatically assign or recommend a retransmission or refresh frequency given a bandwidth and the data size.

Note that scheduled content service 234 can be a source of data (i.e., it may store the data) or it may contain an identifier for the source of the data, in which case the source is a component external to data broadcast system 230. For example, data sources 210, including data source 212, data source 214, data source 216, and data source 218, are external to data broadcast system 230. By way of illustration, data sources 210 may provide sports data such as the current status of a sporting event or information about past sporting events; financial data such as current stock quotes, index values, or historical financial information; entertainment data such as information regarding movies offered through broadcaster 240, weather data, etc. The present invention, however, is not limited to particular data or data sources. Allowing for a source identifier permits any arbitrary source to provide data to the data broadcast system 230. In one embodiment, an identifier for the source of data is a uniform resource locator or uniform resource identifier.

Data broadcast service 232 is responsible for obtaining the data from its source and carrying out the actual transmissions over a broadcast data stream. For example, data broadcast service 232 requests and receives content from data sources 210 over connections 220, including connection 222 to data source 212, connection 224 to data source 214, connection 226 to data source 216, and connection 228 to data source 218. Data sources 210 may comprise one or more of the computers described with reference to FIG. 1, however the present invention does not impose any particular hardware or software requirements on data sources 210. As noted above, scheduled content service 234 also may act as a source of data. Knowledge of the data to be broadcast, including how much bandwidth should be allocated during transmission is received from the scheduled content service 234 over connection 238. The scheduled content service 234 and data broadcast service 232 interact such that all knowledge of data to broadcast, including changes to the data to broadcast and changes to meta-data and scheduling information, is accurately and promptly propagated from the scheduled content service 234 to the data broadcast service 232.

Data broadcast system 230 also may include multiple data broadcast services 232, with each data broadcast service 232 generating one or more broadcast streams. In one embodiment, a data broadcast service generates multiple broadcast streams that are identical to allow for a level of redundancy (and therefore enhanced availability) at the data broadcast system 230 and/or broadcaster 240. In another embodiment, multiple broadcast services 232 (optionally supported by a single scheduled content service 234) each generate distinct broadcast streams, perhaps to support disjoint sets of clients 270 with customized content. It should be noted, however, that the present invention is not limited to any particular embodiment, and encompasses within its scope, each of the foregoing embodiments and any combinations thereof.

Broadcaster 240 receives one or more broadcast streams 236 from the data broadcast system 230 for broadcast to clients 270 over connections 260. Connections 260 may include broadcast over public airways, satellite broadcast, broadcast over the Internet, etc., and/or combinations of the foregoing. Clients 270 and connections 260 may comprise one or more of the computers and connections described above with reference to FIG. 1, but the present invention is not limited by any particular hardware or software configuration. Likewise, the present invention is not necessarily limited to any particular broadcast technology.

Broadcaster 240 also receives video content 250 that is broadcast to clients 270 over connections 260. For example, broadcaster 240 may receive video content 250 that includes free television programming and/or subscription video programming, such as cable channels and movies. Therefore, data broadcast system 230 only accounts for a portion of the total bandwidth delivered to clients 270. It should be noted that although FIG. 2 shows separate client connections, such as connection 262 to client 272, connection 264 to client 274, connection 266 to client 276, and connection 268 to client 278, these connections may be a single broadcast medium, including the aforementioned public airways. Therefore, the connections referenced in conjunction with FIG. 2 should be interpreted broadly to encompass any technology for transferring data from one point to another, including point-to-point network protocols, such as TCP/IP. In one embodiment, connections 260 comprise a satellite broadcast link.

Each of clients 270 may be executing one or more applications concurrently. These applications, for example, may present a variety of sports data, including the current status of one or more sporting events, current or historical financial data, including stock quotes and index values, weather data, and entertainment data for content offered through broadcaster 240, including information about currently available movies and associated actors. Because multiple applications may be executing concurrently at each client, data from multiple sources may need to arrive at clients 270 simultaneously.

Simultaneous delivery of data, including delivery of real-time data, may be accomplished using any of several techniques and may depend on the needs of a particular application. According to one technique, data for each application may be delivered sequentially, but at a sufficiently high rate that each application's demand for data is met. Data destined for multiple applications may be interleaved so that each application receives at least some portion of data, rather than receiving all data at one time. Alternatively, data for multiple applications may be delivered simultaneously using distinct streams or sub-streams. Combinations of the foregoing techniques also may be used and those of skill in the art may recognize yet additional techniques. In one embodiment, whether data is interleaved or sent sequentially is specified at the meta-data level. It also should be noted that what qualifies as either "simultaneous" or "real-time" is largely dependent on the needs of a particular application, both in terms of the amount and timing of any data that is consumed. As used in this application, therefore, "simultaneous" and "real-time" should be interpreted broadly to encompass each of the circumstances described above, including sequential and interleaved data delivery.

Figure 3:
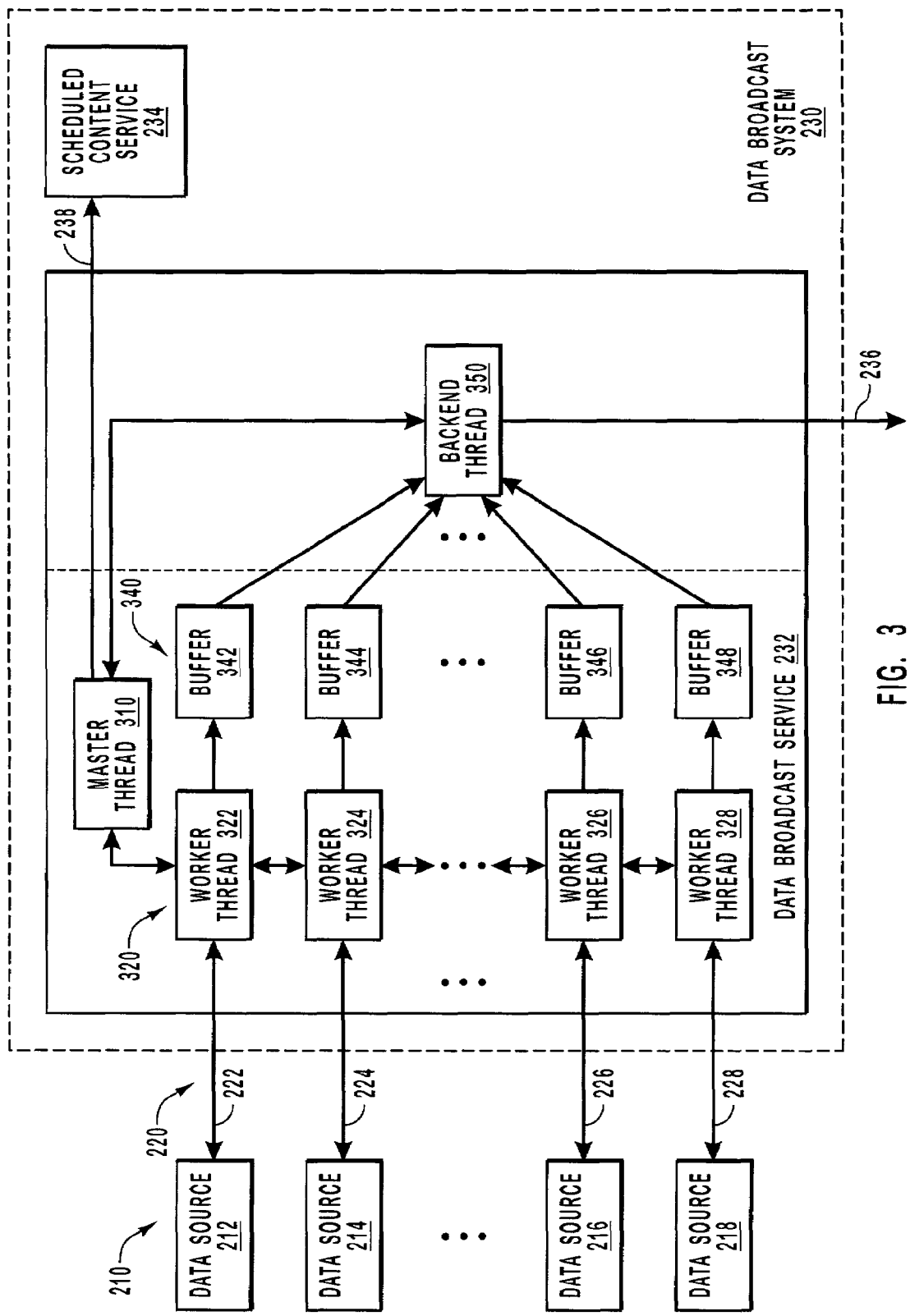
FIG. 3 provides additional detail for one embodiment of a data broadcast system capable of practicing the present invention.

FIG. 3 provides additional detail for one embodiment of data broadcast system 230. As described above data broadcast service 232 is responsible for obtaining the data from its source to produce one or more data streams 236. Information about what data to obtain and when to obtain it is maintained by scheduled content service 234. Data broadcast service 232 includes a number of threads, including master thread 310, worker threads 320 and backend thread 350. Master thread 310 handles communication between scheduled contend service 234 and data broadcast service 232, as well as coordinating the operation of worker threads 320 and backend thread 350.

When scheduled content service 234 identifies data that should be added to the one or more broadcast data streams 236, master thread 310 instructs one of the worker threads 320 to request the data and place it into one of the buffers 340. For example, worker threads 322, 324, 326, and 328 request and receive data from data sources 212, 214, 216, and 218 over connections 222, 224, 226, and 228, and place the data in buffers 342, 344, 346, and 348, respectively. Master thread 310 also instructs backend thread 350 on which, how much of, and when buffers 342, 344, 346, and 348 should be read and added to the one or more broadcast streams 236. In one embodiment, master thread 310 is responsible for spawning other threads to update scheduled content service 234 regarding the data added to broadcast streams 236. It should be noted, however, that the present invention does not require the use of threads and may be implemented according to any of a wide variety of design choices.

The data added to the one or more data streams 236 may be files intended to be stored at least temporarily at the one or more client systems, streaming data that is intended to be consumed as it is delivered, or any other type of data that may be transferred to the client systems 270. Although data is broadcast to all client systems 270, the data may be intended for and consumed by only a single client system. Sending data to individual clients over a broadcast stream tends to be an inefficient use of broadcast bandwidth, but the benefits of being able to send data to a single client may be significant, and therefore justify the inefficiency. It also should be noted that demand for data at a client system does not necessarily imply a request for the data from the client system. For example, an application may consume data that is broadcast, without first having to request the data. Thus, data broadcast to client systems 270 may anticipate a need or desire for the data.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of the acts and/or steps.

Figure 4:
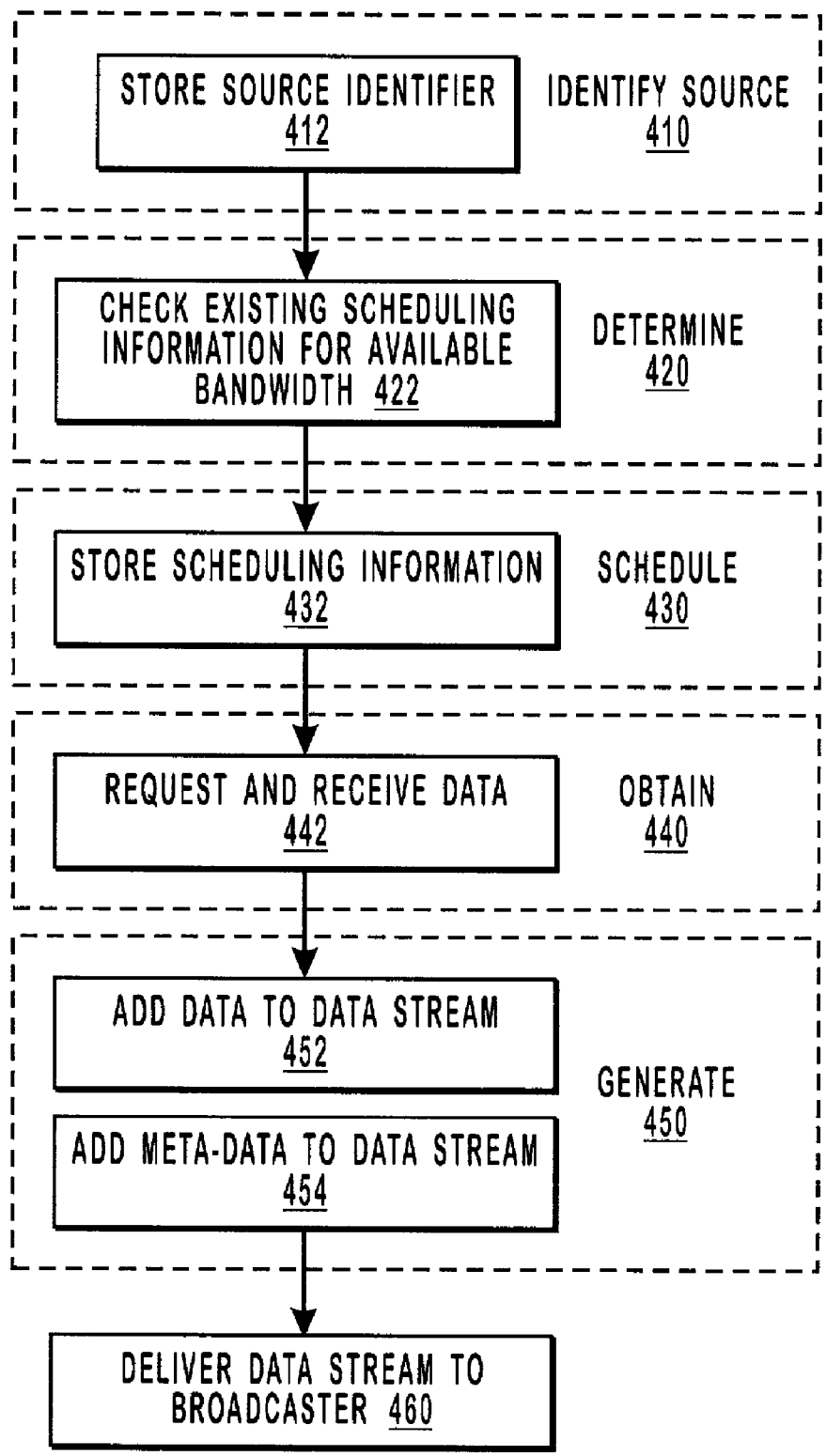
FIG. 4 is a flow diagram describing various acts and steps for methods according to the present invention.

FIG. 4 is a flow diagram describing various acts and steps for methods according to the present invention. A step for identifying (410) at least one data source where data to be included within the data stream may by obtained, may include an act of storing (412) an identifier for the at least one data source. A step for determining (420) whether or not bandwidth is available in a data stream, may include an act of checking (422) any previously existing scheduling information to verify that bandwidth is available in the data stream prior to storing scheduling information for a data source. The step for determining (420) also may include other types of validation and consistency checking. Although not shown, a step for recommending either (i) a bandwidth for a specified refresh or retransmission frequency, or (ii) a refresh or retransmission frequency for a specified bandwidth may include an act of calculating the recommended bandwidth and refresh or retransmission frequency.

A step for scheduling (430) a time when data from each identified data source should be added to a data stream for broadcast to one or more client systems, may include an act of storing (432) scheduling information that comprises a time when data from at least one data source should be added to the data stream for broadcast. A step for obtaining (440) data from at least one data source may include the acts of requesting and retrieving (442) the data from the at least one data source. A step for generating (450) a data stream with data obtained from the at least one data source, may include an act of adding (452) data obtained from the at least one data source to the data stream and an act of adding (454) meta-data to the data stream. In one embodiment, the data and meta-data are delivered to the broadcaster through a single communication pipe, with the meta-data being added or written to the pipe first, followed by the data itself. However, the present invention is not limited to any particular communication mechanism or ordering of data and meta-data. A step for including (not shown) meta-data in the data stream may comprise an act of adding meta-data to the data stream. The present invention further may include an act of delivering (460) a data stream to a broadcaster for broadcast to one or more client systems.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a data broadcast system comprising one or more streams for broadcasting data to client systems, wherein the data broadcast system broadcasts a variety of data at particular times in order to meet demand for the variety of data at the client systems, a method of generating a data stream of a specified bandwidth for broadcast to one or more client systems, the method comprising acts of:

storing an identifier for at least one data source, the identifier indicating where data to be included within the data stream may be obtained and a bandwidth allocation associated with requirements for broadcasting the data;

for each identifier, storing scheduling information that comprises a time when the data from the at least one data source should be added to the data stream for broadcast to the one or more client systems, and wherein the scheduling information further comprises at least one of a retransmission frequency when said data includes static data or a refresh frequency when said data includes dynamic data, and such that the existing scheduling information is used to determine availability of bandwidth within the data stream;

requesting and receiving the data from the at least one data source; and at the time specified in the scheduling information, adding the data obtained from the at least one data source to the data stream, wherein the data is broadcast to the one or more client systems in accordance with the scheduling information.

2. A method as recited in claim 1, wherein the data stream comprises a plurality of sub-streams, the method further comprising acts of:
storing a plurality of identifiers for a plurality of data sources;
for each identifier, storing scheduling information that comprises a time when the data from each of the plurality of sources should be added to the data stream for broadcast to the one or more client systems, wherein the scheduling information indicates that data from at least two of the data sources should be added to the data stream for simultaneous broadcast to the one or more client systems;
requesting and receiving the data from the at least two data sources; and
at the time specified in the scheduling information, adding the data obtained from the at least two data sources to distinct sub-streams within the data stream, whereby the data from the at least two data sources arrives at the one or more client systems simultaneously.

3. A method as recited in claim 2, wherein at least one of the plurality of sub-streams is dedicated to broadcasting data in real time.

4. A method as recited in claim 2, wherein the data broadcast system further comprises (i) a scheduled content service for storing the plurality of identifiers and for storing scheduling information for each identifier, and (ii) a data broadcast service for requesting and receiving data from the data sources and for adding the data obtained from the data sources to the data stream.

5. A method as recited in claim 1, wherein the scheduling information further comprises (i) a time to begin broadcast of the data, (ii) a retransmission frequency, (iii) a refresh frequency, (iv) a time when a final broadcast of the data should end, (v) meta-data associated with the data, (vi) a bandwidth allocation for the data, and (vii) data size information for static data.

6. A method as recited in claim 1, wherein each of the one or more clients is running one or more applications, and wherein the broadcast data stream provides the data for each of the one or more applications to consume.

7. A method as recited in claim 1, further comprising an act of checking any previously existing scheduling information to verify that bandwidth is available in the data stream prior to storing the scheduling information.

8. A method as recited in claim 1, wherein the data is of a known size, the method further comprising an act of calculating at least one of (i) a recommended bandwidth for a specified refresh or retransmission frequency, or (ii) a recommended refresh or retransmission frequency for a specified bandwidth.

9. A method as recited in claim 1, wherein the identifier for the at least one data source is a uniform resource identifier or uniform resource locator.

10. A method as recited in claim 1, wherein the data comprises one or more files and the scheduling information further comprises meta-data associated with each of the one or more files, the meta-data comprising at least one of (i) an expiration time after which the one or more clients may delete a file, (ii) an extension time for extending the expiration time of a file that already exists, (iii) one or more allowed update flags if a file represents a directory, (iv) a trigger for causing some action to he performed at a client system, (v) one or more expressions for specifying one or more conditions that are associated with a file.

11. A method as recited in claim 10, further comprising the act of adding the meta-data to the data stream.

12. A method as recited in claim 1, further comprising an act of delivering the data stream to a broadcaster for broadcast to the one or more client systems.

13. In a data broadcast system comprising one or more streams for broadcasting data to client systems, wherein the data broadcast system broadcasts a variety of data at particular times in order to meet demand for the variety of data at the client systems, a method of generating a data stream of a specified bandwidth for broadcast to one or more client systems, the method comprising steps for:
identifying at least one data source where data to be included within the data stream may be obtained and a bandwidth allocation associated with requirements for broadcasting the data;
scheduling a time when data from each identified data source should be added to the data stream for broadcast to the one or more client systems, the scheduled time being a part of scheduling information for the data to be included within the data stream, wherein the scheduling information further comprises at least one of a retransmission frequency when said data includes static data or a refresh frequency when said data includes dynamic data, and wherein the scheduling information is used to schedule the time only after first checking any previously existing scheduling information corresponding to the data stream to verify that adequate bandwidth is available in the data stream for adding the data to the data stream at the scheduled time, and such that the existing scheduling information is used to determine availability of bandwidth within the data stream;
obtaining the data from the at least one data source; and
at the time specified in the scheduling information, generating the data stream with the data obtained from the at least one data source, wherein the data is broadcast to the one or more client systems in accordance with the scheduling information.

14. A method as recited in claim 13, wherein the data stream comprises a plurality of sub-streams, the method further comprising steps for:
identifying a plurality of data sources where data to be included within the data stream may be obtained;
scheduling a time when data from each identified data source should be added to the data stream for broadcast to the one or more client systems, wherein data from at least two of the plurality of data sources is scheduled to be added to the broadcast data stream simultaneously;
obtaining the data from the at least two data sources; and
at the time specified in the scheduling information, generating the data stream that comprises at least two distinct sub-streams with the data obtained from the at least two data sources, whereby the data from the at least two data sources arrives at the one or more client systems simultaneously.

15. A method as recited in claim 14, wherein at least one of the plurality of sub-streams is dedicated to broadcasting data in real time.

16. A method as recited in claim 13, wherein the scheduling information further comprises at least one of (i) a time to begin broadcast of the data, (ii) a retransmission frequency, (iii) a refresh frequency, (v) meta-data associated with the data, (vi) a bandwidth allocation for the data, or (vii) data size information for static data.

17. A method as recited in claim 13, further comprising a step for determining, based on any previously existing scheduling information and prior to scheduling a time when data from each identified data source should be added to the data stream, whether or not bandwidth is available in the data stream.

18. A method as recited in claim 13, wherein the data is of a known size, the method further comprising a step for recommending (i) a bandwidth for a specified refresh or retransmission frequency, or (ii) a refresh or retransmission frequency for a specified bandwidth.

19. A method as recited in claim 13, wherein the data comprises one or more files and the scheduling information further comprises meta-data associated with each of the one or more files, the meta-data comprising at least one of (i) an expiration time after which the one or more clients may delete a file, (ii) an extension time for extending the expiration time of a file that already exists, (iii) one or more allowed update flags if a file represents a directory, (iv) a trigger for causing some action to be performed at a client system, (v) one or more expressions for specifying one or more conditions that are associated with a file, and wherein the method further comprises a step for including the meta-data in the generated data stream.

20. A computer program product for implementing, in a data broadcast system comprising one or more streams for broadcasting data to client systems, wherein the data broadcast system broadcasts a variety of data at particular times in order to meet demand for the variety of data at the client systems, a method of generating a data stream of a specified bandwidth for broadcast to one or more client systems, the computer program product comprising:
one or more physical computer-readable media carrying machine-executable instructions that implement the method recited in claim 1.

21. A computer program product as recited in claim 20, wherein the data stream comprises a plurality of sub-streams, the method further comprising acts of:
storing a plurality of identifiers for a plurality of data sources;
for each identifier, storing scheduling information that comprises a time when the data from each of the plurality of sources should be added to the data stream for broadcast to the one or more client systems, wherein the scheduling information indicates that data from at least two of the data sources should be added to the data stream for simultaneous broadcast to the one or more client systems;
requesting and receiving the data from the at least two data sources; and
at the time specified in the scheduling information, adding the data obtained from the at least two data sources to distinct sub-streams within the data stream, whereby the data from the at least two data sources arrives at the one or more client systems simultaneously.

22. A computer program product as recited in claim 21, wherein at least one of the plurality of sub-streams is dedicated to broadcasting data in real time.

23. A computer program product as recited in claim 21, wherein the data broadcast system further comprises (i) a scheduled content service for storing the plurality of identifiers and for storing scheduling information for each identifier, and (ii) a data broadcast service for requesting and receiving data from the data sources and for adding the data obtained from the data sources to the data stream.

24. A computer program product as recited in claim 20, wherein the scheduling information further comprises at least one of (i) a time to begin broadcast of the data, (ii) a retransmission frequency, (iii) a refresh frequency, (iv) a time when a final broadcast of the data should end, (v) meta-data associated with the data, (vi) a bandwidth allocation for the data, or (vii) data size information for static data.

25. A computer program product as recited in claim 20, wherein each of the one or more clients is running one or more applications, and wherein the broadcast data stream provides the data for each of the one or more applications to consume.

26. A computer program product as recited in claim 20, the method further comprising an act of checking any previously existing scheduling information to verify that bandwidth is available in the data stream prior to storing the scheduling information.

27. A computer program product as recited in claim 20, wherein the data is of a known size, the method further comprising an act of calculating at least one of (i) a recommended bandwidth for a specified refresh or retransmission frequency, or (ii) a recommended refresh or retransmission frequency for a specified bandwidth.

28. A computer program product as recited in claim 20, wherein the identifier for the at least one data source is a uniform resource identifier or uniform resource locator.

29. A computer program product as recited in claim 20, wherein the data comprises one or more files and the scheduling information further comprises meta-data associated with each of the one or more files, the meta-data comprising at least one of (i) an expiration time after which the one or more clients may delete a file, (ii) an extension time for extending the expiration time of a file that already exists, (iii) one or more allowed update flags if a file represents a directory, (iv) a trigger for causing some action to be performed at a client system, (v) one or more expressions for specifying one or more conditions that are associated with a file, and wherein the method further comprises the act of adding the meta-data to the data stream.

30. A computer program product as recited in claim 20, further comprising an act of delivering the data stream to a broadcaster for broadcast to the one or more client systems.

31. A computer program product for implementing, in a data broadcast system comprising one or more streams for broadcasting data to client systems, wherein the data broadcast system broadcasts a variety of data at particular times in order to meet demand for the variety of data at the client systems, a method of generating a data stream of a specified bandwidth for broadcast to one or more client systems, the computer program product comprising:
one or more physical computer-readable media carrying machine-executable instructions that implement the method recited in claim 13.

32. A computer program product as recited in claim 31, wherein the data stream comprises a plurality of sub-streams, the method further comprising steps for:
identifying a plurality of data sources where data to be included within the data stream may be obtained;
scheduling a time when data from each identified data source should be added to the data stream for broadcast to the one or more client systems, wherein data from at least two of the plurality of data sources is scheduled to be added to the broadcast data stream simultaneously;
obtaining the data from the at least two data sources; and
at the time specified in the scheduling information, generating the data stream that comprises at least two distinct sub-streams with the data obtained from the at least two data sources, whereby the data from the at least two data sources arrives at the one or more client systems simultaneously.

33. A computer program product as recited in claim 32, wherein at least one of the plurality of sub-streams is dedicated to broadcasting data in real time.

34. A computer program product as recited in claim 31, wherein the scheduling information further comprises at least one of (i) a time to begin broadcast of the data, (ii) a retransmission frequency, (iii) a refresh frequency, (iv) a time when a final broadcast of the data should end, (v) meta-data associated with the data, (vi) a bandwidth allocation for the data, and (vii) data size information for static data.

35. A computer program product as recited in claim 31, the method further comprising a step for determining, based on any previously existing scheduling information and prior to scheduling a time when data from each identified data source should be added to the data stream, whether or not bandwidth is available in the data stream.

36. A computer program product as recited in claim 31, wherein the data is of a known size, the method further comprising a step for recommending (i) a bandwidth for a specified refresh or retransmission frequency, and (ii) a refresh or retransmission frequency for a specified bandwidth.

37. A computer program product as recited in claim 31, wherein the data comprises one or more files and the scheduling information further comprises meta-data associated with each of the one or more files, the meta-data comprising at least one of (i) an expiration time after which the one or more clients may delete a file, (ii) an extension time for extending the expiration time of a file that already exists, (iii) one or more allowed update flags if a file represents a directory, (iv) a trigger for causing some action to be performed at a client system, (v) one or more expressions for specifying one or more conditions that are associated with a file, and wherein the method further comprises a step for including the meta-data in the generated data stream.

38. A method as recited in claim 1, the method further including recommending a refresh or retransmission frequency for data having a specified bandwidth.

39. A method as recited in claim 1, wherein the data stream is broadcast to a plurality of clients even though it is only intended to be consumed by one of the clients and accordingly consumed by only the one of the clients.

40. A method as recited in claim 1, wherein the scheduling information further comprises a time to begin broadcast of the data.

41. A method as recited in claim 1, wherein the scheduling information further comprises a retransmission frequency to increase the probability that static data is received by the one or more client systems.

42. A method as recited in claim 1, wherein the scheduling information further comprises a refresh frequency to assure that dynamic data is updated at the one or more client systems.

43. A method as recited in claim 1, wherein the scheduling information further comprises a time when a final broadcast of the data should end.

44. A method as recited in claim 1, wherein the scheduling information further comprises a bandwidth allocation for the data and data size information for static data.

* * * * *